(12) United States Patent
Richardson

(10) Patent No.: US 7,085,044 B2
(45) Date of Patent: Aug. 1, 2006

(54) BRACED MICROSCOPE

(75) Inventor: Timothy M. Richardson, Bolton (CA)

(73) Assignee: 1192062 Alberta Ltd., Calgary (CA)

( * ) Notice: Subject to any disclaimer, the term of this patent is extended or adjusted under 35 U.S.C. 154(b) by 0 days.

(21) Appl. No.: 10/736,751

(22) Filed: Dec. 17, 2003

(65) Prior Publication Data

US 2005/0018280 A1    Jan. 27, 2005

Related U.S. Application Data

(63) Continuation of application No. 09/743,222, filed on Apr. 11, 2001, which is a continuation of application No. PCT/CA99/00626, filed on Jul. 12, 1999, now Pat. No. 6,704,140.

(30) Foreign Application Priority Data

Jul. 10, 1998 (CA) ................................. 2243090

(51) Int. Cl.
G02B 21/00 (2006.01)
G02B 21/26 (2006.01)

(52) U.S. Cl. ........................ 359/368; 359/391

(58) Field of Classification Search ........ 359/368–396, 359/808–823

See application file for complete search history.

(56) References Cited

U.S. PATENT DOCUMENTS

| | | | |
|---|---|---|---|
| 3,259,012 A * | 7/1966 | Locquin | 359/383 |
| 3,814,356 A | 6/1974 | Coleman et al. | 248/636 |
| 3,870,414 A | 3/1975 | Duffy | 356/496 |
| 4,128,944 A * | 12/1978 | Stanton | 359/376 |
| 4,210,384 A | 7/1980 | Meyer et al. | 359/363 |
| 4,784,481 A | 11/1988 | Wuerfell | 359/391 |
| 5,332,881 A * | 7/1994 | Topkaya et al. | 219/121.75 |
| 5,870,222 A | 2/1999 | Yamamoto et al. | 359/368 |
| 6,151,161 A | 11/2000 | Mayer et al. | 359/392 |
| 6,239,905 B1 * | 5/2001 | Toyoda et al. | 359/392 |
| 6,252,704 B1 * | 6/2001 | Omi | 359/391 |
| 6,285,498 B1 | 9/2001 | Mayer | 359/392 |

FOREIGN PATENT DOCUMENTS

| | | | |
|---|---|---|---|
| DE | 900 4328 | 5/2001 | |
| EP | 0 895 607 | 1/2002 | |
| JP | 63-153405 | * 6/1988 | 359/391 |
| JP | 5-323201 | * 12/1993 | 359/368 |
| WO | WO 00/135151 A2 | 5/2001 | |

OTHER PUBLICATIONS

Patent Abstracts of Japan, Olympus Optical, Optical Microscope Abstract of JP08114751A (May 7, 1997).

* cited by examiner

Primary Examiner—Thong Q Nguyen
(74) Attorney, Agent, or Firm—Torys LLP

(57) ABSTRACT

A microscope having a pair of braces connecting a head portion, carrying an objective, to the base, to which a stage is attached. The braces, which preferably have resonant frequency that is not a harmonic or sub-harmonic of the fundamental frequency of vibration of the C-shaped frame, function to reduce vibration and enhance the clarity of the image viewed through the objective. In one embodiment, the length of the braces along a vertical optical axis of the microscope can be adjusted to provide very fine focusing control.

19 Claims, 4 Drawing Sheets

BRACED MICROSCOPE

RELATED APPLICATIONS

This application is a continuation application of U.S. patent application Ser. No. 09/743,222, filed under 35 U.S.C. § 371(c) in the USPTO on Apr. 11, 2001, issued as U.S. Pat. No. 6,704,140 on Mar. 9, 2004, which application is a 371 (national stage entry) of international patent application No. PCT/CA99/00626 filed on Jul. 12, 1999 and published under WO 00/03283 on Jan. 20, 2000, which application claims foreign priority from Canadian Patent Application No. 2,243,090 filed Jul. 10, 1998. All of these applications are incorporated herein by reference.

FIELD OF THE INVENTION

The present invention relates to microscopes and methods of obtaining images therewith. More particularly, the present invention relates to a method of obtaining images with Inverted Darkfield Contrast (IDC) microscopes and a novel IDC microscope.

BACKGROUND OF THE INVENTION

For many years light microscopes have been considered a mature technology. While there have been notable attempts to extend the capabilities of the light microscope, to date such attempts have not achieved substantial gains in performance and have generally been obtained at significantly increased costs. Vibrations in microscopes have been known as a major factor contributing to the limit on resolving power. Vibrations in the microscope frame have previously been addressed by building super rigid or heavy frames, or by constructing horizontal microscopes on massive optical bench_style frames. Other attempts to improve the vibration performance have used passive or active vibration damping tables, feet or platforms.

The generation of image contrast in microscopes is an area where there has been considerable work carried out in the past. Attempts to increase the contrast of observed biological samples have resulted in many new methods such as phase contrast, interference contrast, Hoffman modulation contrast, differential interference contrast, polarized light microscopy, darkfield microscopy and fluorescent microscopy. The challenge of generating image contrast at the extreme limit of resolution yielded such techniques as high power immersion darkfield, and ultramicroscopic illumination. Phase and interference contrast techniques introduced artifacts, some of which were asymmetrical, which made the images difficult to relate to the real structure of the samples being viewed. Darkfield and fluorescent techniques presented image information in a form that is most unfamiliar to visual capabilities, much in the same way that we are unable to extract information from a photographic or electronic "negative" image.

Attempts to gain more information about cells in real time has yielded confocal microscopy which uses high power laser light sources which scan the sample area to build a final image of the sample, and newer masked confocal techniques that can build higher speed images of live samples. In general, the frame/field rate of the confocal systems is too slow for studying the high speed motion of many components in biological systems since they exhibit high speed motion.

Attempts to yield high resolution have been based on the formula for microscopic resolution first developed by Ernst Abbe, resolution limit=wavelength of light/(k×numerical aperture of the objective). Values for k ranging from 1.6 to 2 have been accepted for over 50 years but the inventor's recent work suggests the value of k can be lowered and needs to be more fully studied when applied to improved optical systems with new methods of illumination and imaging means.

As microscope systems have become more complex, more glass surfaces created more light loss due to transmission losses in the glass elements, internal reflection and stray light. The stray light contributed to poor contrast and the internal reflections and transmission losses, together with the stray light, meant that progressively more powerful light sources were needed to produce useable image brightness. These high powered sources must propagate the light at high fluxes through the sample space since most of the lossy components are between the sample and the imaging means. Modern binocular and trinocular systems with their attendant prisms, mirrors and lenses are particularly inefficient and require higher light levels.

SUMMARY OF THE INVENTION

It is an object of the present invention to provide a novel IDC microscope and a novel method of obtaining images with an IDC.

According to a first aspect of the present invention, there is provided a novel method of achieving contrast for microscopical imaging of preparations of living cells and other types of objects is described along with improvements to microscopes. This method combines the traditional darkfield illumination technique with electronic image inversion (converting a positive to a negative image) and other improvements to further enhance the contrast and resolution of the final image. The method is referred to herein as Inverted Darkfield Contrast and is believed to be particularly suitable for viewing live cells in real time with no staining or preparation.

The embodiments shown herein are primarily based on a video microscope in which image resolution, contrast and optical efficiency are optimized. In microscopes in accordance with the present invention there is usually no intervening binocular or trinocular arrangement or eyepiece between the objective and the imaging system, which can be any type of imaging means including film cameras, analog or digital video cameras or image intensifiers. The microscope system can use a pre_focused and aligned lamp and reflector to direct a larger than usual portion of the light from the lamp into the illuminating beam. The illuminating beam is directed through a beam expander which controls the diameter of the illuminating beam while maintaining parallel rays of light. The illuminating beam passes through apertures to control stray light.

Careful attention is paid to controlling the illuminating wavelengths of light to improve the resolution of the microscope. In particular, all the non_visible wavelengths in the ultraviolet (UV) and infrared (IR) portion of the spectrum are preferably eliminated to improve image quality. The rays of light leaving the objective are also passed through apertures and baffle tube(s) to reduce stray light and enhance contrast. Anti_vibration means are also provided to control the motion of the objective, relative to the sample being viewed, and the position of the imaging device relative to the objective. Control of stray light in the objective and in the coupler between the objective and the imaging device also help to improve contrast and resolution.

The signal from the imaging device is inverted to form the negative of the normal image. In this way the traditional darkfield image appears as a high contrast brightfield image in the final monitor or computer display.

The present invention comprises a variety of mechanical and optical improvements to a microscope in order to achieve Inverted Darkfield Contrast (IDC). More specifically, a video microscope is provided which can include improvements to the illumination system, the condenser, the slide holder, the objectives, the tube, the microscope stand and the image acquiring system to produce a novel IDC microscope.

The present invention provides a method for obtaining high contrast images of living biological samples such as cells in real time with no staining or fluorochemistry required. The method is applicable to imaging a variety of materials, substances and structures, including cells, internal cellular structures, bacteria, viruses, fungi and plant materials. The present invention also includes improvements in microscope technology including improvements to stand design, illuminators, condensers, objectives, imaging systems and to video processing.

While the concept of darkfield imaging is not new and the use of video positive to negative inversion is known in the television broadcast special effects field, the present invention is the first application of these unrelated techniques to obtain high contrast images of samples such as living biological material. The present invention provides particular advantages as it can provide images which look like stained biological materials, so that biologists can readily interpret and accept the information that the images present, without requiring the staining of the imaged samples. The present invention can improve the contrast, resolution and speed of acquisition of the image, without significantly increasing the cost or complexity of the microscope.

Another aspect of the invention relates to a microscope which includes a head portion, including an objective; a base portion having a stage mounted thereto; a C-shaped frame connecting the head portion and base portion; and two curvilinear braces connecting the head portion to the base portion. The braces are employed to reduce vibration and enhance the clarity of the images viewed by the objective. More particularly, in a preferred embodiment of this aspect of the invention, each brace has a resonant frequency that is not a harmonic or sub-harmonic of the fundamental frequency of vibration of the C-shaped frame.

In preferred embodiments, the braces are mounted on either side of the stage, and each brace is preferably disposed along a vertical optical axis of the microscope.

Fine focus of the microscope may be achieved using means for coupling the two braces together and forcing the braces closer together or further apart, thereby adjusting the distance between the objective and the stage. For example, a hydraulic cylinder, a piezoelectric strut or a piezoelectric layer in a strut may be used to couple the braces together and selectively force the braces closer or further apart. Additionally or alternatively, fine focus control can be provided using means for altering the length of the braces. For example, each brace may inclue a piezoelectric layer therein for altering the length of the brace.

According to another aspect of the invention a method is provided of operating a microscope comprising a head portion having an objective mounted thereto and a base portion having a stage mounted thereto. The method includes attaching at least one brace between the head portion and base portion and selectively adjusting the distance between the objective and the stage by varying the length of the brace along a vertical optical axis of the microscope. The length of the brace along the vertical optical axis may be adjusted by expanding or contracting the overall length of the brace. In one embodiment, the brace includes a piezoelectric layer, the thickness of which can be varied by the application of an applied voltage. Additionally or alternatively, the length of the brace along the vertical optical axis may be adjusted by forcing the brace to move in a direction transverse to the vertical optical axis.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

The present invention forms a darkfield image with a high numerical aperture (NA) optical system and electronically inverts the digitized darkfield image to produce a negative image of the darkfield image. The negative image is an apparent brightfield image, with very high contrast and resolution.

While it is possible to implement the method of the present invention using standard microscope illuminators, it is presently preferred that the light source employed with the present invention be considered on the basis of a "photon budget", where the intended destination of each photon from the light source is mapped and accounted for in the design of the IDC microscope. In order to achieve this goal, in a presently preferred embodiment of the invention, the light source is selected and constructed as follows.

In conventional microscopes, tungsten, tungsten halogen, quartz halogen, or arc light sources are employed. These light sources are not well controlled in terms of the position of the light emitting surface of the source and consequently there is usually a means for centering the light emitting surface in the X, Y and Z directions with respect to the optical path of the microscope.

Figure 1:
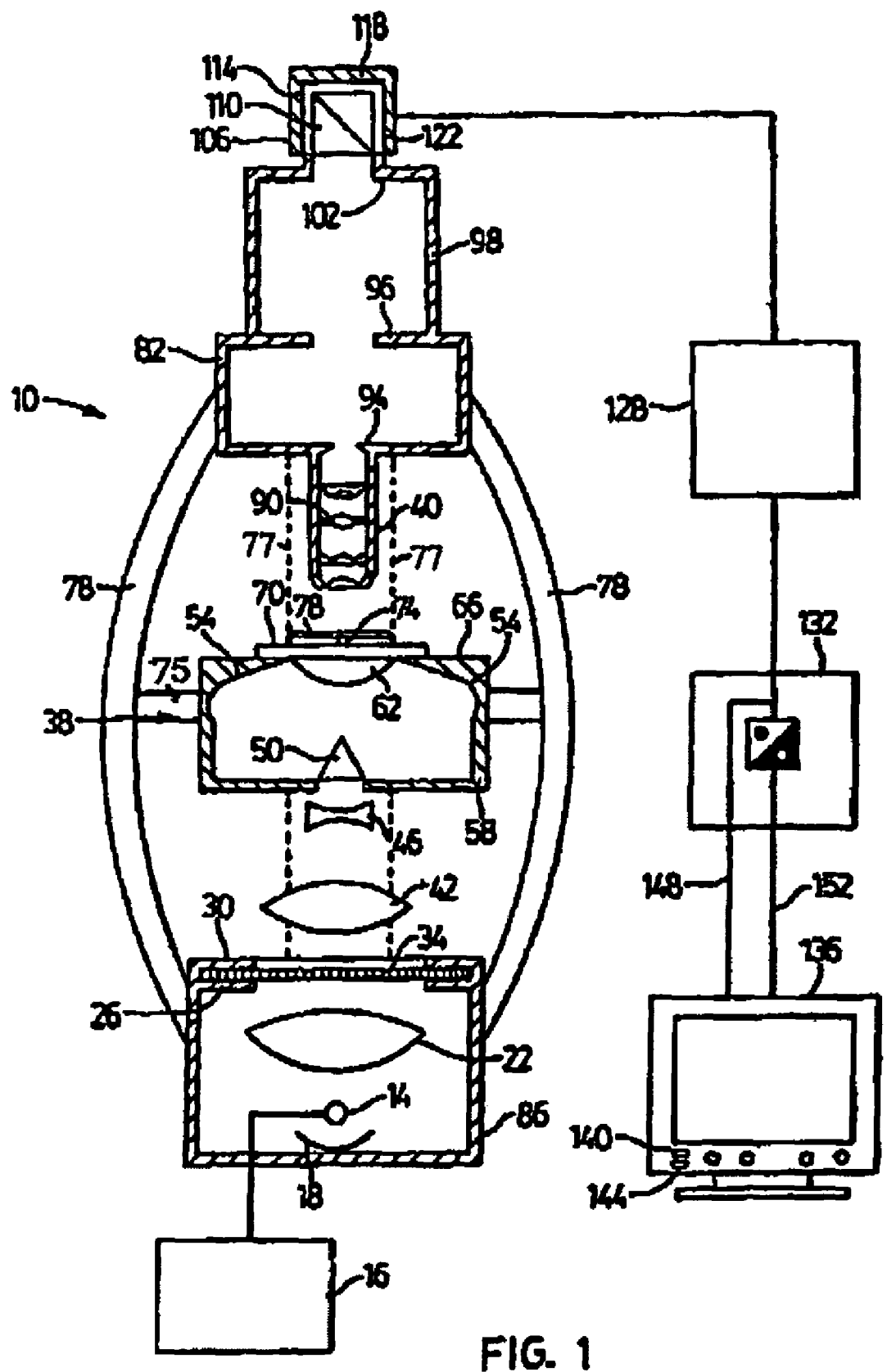
FIG. 1 shows an embodiment of an IDC microscope in accordance with the present invention.

In contrast, in the presently preferred embodiment of the invention illustrated in FIG. 1, the microscope indicated generally at 10, can employ a light source 14 in which the exact location of the light emitting component is exactly controlled by the body of light source 14 and/or the socket it is mounted in. This eliminates the need for a centering mechanism for light source 14 and ensures that substantially the highest possible intensity and geometrical control of the beam and repeatability is achieved. Suitable examples of such light sources are the Welch Allen lamps for medical applications, the ILC arc lamps, the GE and Sylvania prefocused lamps and other, similar, light sources. To the best of the present inventor's knowledge, to date these light sources have not been employed with light microscopes.

In microscope 10, light source 14, which is supplied with the necessary power from a suitable power supply 16, is mounted such that as much light as possible from the light emitting surface, or surfaces, is focused by a suitable. illuminator focus means, such as a mirror 18 behind light source 14 and/or a lens 22 in front of light source 14. The light from the back of light source 14 is focused back onto, or adjacent to, the emitting surface(s) of light source 14 by mirror 18. The light from the front of light source 14 and that returned by mirror 18 is focused into a collimated beam by lens 22, or a set of lenses, in front of light source 22. Suitable apertures 26, baffles 30 or tubular structures (not shown) are employed to ensure that the light from lens 22 is substantially completely collimated. It is desired to collimate the light from lens 22 so that little or no off_axis light enters the condenser system, described below, of microscope 10. Such off_axis light would become "stray light" in the imaging optics and would degrade the contrast of the final image.

As most light sources emit light which is outside the range of human vision, and the corrected range of microscope optics, a filter means 34 is provided in the path of the illuminating beam to filter the light to correspond as closely as possible to the range of wavelengths for which the optics of microscope 10 are designed. Filter means 34 can be included anywhere in the illumination beam path between the light source 14 and the final optics of the condenser 38 and filter means 34 can consist of the one or more heat filters such as Schott KG1 or KG5 glass, and can include additional interference filters to attenuate the red or blue end of the light spectrum, and can exclude the ultraviolet portion of the spectrum with Schott WG or GG series filters, for example. By eliminating the infrared portion of the spectrum, heating of the sample with its attendent impact on living samples is greatly reduced. Eliminating the high energy ultraviolet light from the light reaching the sample means that samples are not subjected to as much DNA, cellular and bleaching damage. This means that samples can be maintained on the microscope for longer periods of time during continuous study. It also means that the samples being studied are not subject to the abnormal levels of infrared and ultraviolet from the usual sources used in microscopes which are generally incandescent, metal halogen, or xenon or mercury arc sources, as compared to the ratio of infrared to visible to ultraviolet in the light coming from the sun, It is an important feature of this microscope that living samples are exposed only to ratios of infrared to visible and ultraviolet to visible at or less than ratios that samples would have been exposed to in nature. This feature means that samples behave in a fashion which is more closely analogous to their behavior in their natural environment.

By restricting the wavelengths of light present in the illuminating beam it is possible to operate the objective 40 of microscope 10 with light which forms a higher resolution image of the object due to the matching of the light to the design specifications of objective 40 of microscope 10. In this way, the light passing through the sample can be limited to match the best spherical and chromatic aberration correction points of the objective. Typically the light would be limited to two wavelength regions for an achromatic objective or three wavelength regions for an apochromatic objective. This limitation on the wavelength of the light further reduces sample heating and non thermal effects.

It is contemplated that non plan optics will generally give the best images when used in this invention. This is because there are no trade offs for flatness of field and the IDC system uses only a small portion of the inside area of the total image. Accordingly flatness of field is not such a concern as it would be in other microscope systems which utilize the full field of view of the objective.

Where it is desirable to include fluorescence capability for microscope 10, a position can be provided in filter means 34 for an illuminating filter which limits the illuminating beam wavelengths to only those wavelengths that are important for exciting the fluorophores being used with the sample. In this case, the substrate of this filter should be kept as thin a possible so that the ray path of the illuminating beam is disrupted as little as possible. As the method of illumination in the present invention is darkfield, fluorescent imaging can be applied to this method with almost the same quality of results as with reflected light microscopy, even though the image from the IDC microscope appears to be and is nominally a "brightfield" transmitted light technique. In order to match the illuminating beam to characteristics of condenser 38 being employed, additional optical systems are included. Specifically, the collimated illumination beam from light source 14 passes through one or both of two types of optical systems. The first type of optical system is operable to modify the illuminating beam dimension to match the optical requirements of condenser 38. This system can be a system of fixed lenses 42 and 46 or a zoom lens device (not shown), either of which operate to supply substantially the highest possible amount of light from illumination source 14 to condenser 38 in a beam geometry selected to take full advantage of the characteristics of condenser 38.

When a darkfield condenser is employed, a parallel beam of light can be the most advantageous while in a conventional brightfield condenser, a converging beam of light is desired where the converging beam presents the image of the filament of the lamp at the back focal plane of the condenser to achieve Kohler illumination. If desired, the illumination beam can pass through a second optical system (not shown) to reshape the illuminating beam to achieve Kohler illumination, as is well known in the art.

Condenser 38 can be a high numerical aperture darkfield condenser of any type, as is known to those of skill in the art. The design of condenser 38 should create an inner and outer cone of illumination with a numerical aperture to match or exceed the optical characteristics of the objective 40 being employed. The presently preferred numerical apertures for condenser 38 are 1.27 for the inner cone and 1.33 for the outer cone for most biological applications, although for lower powered objectives with lower numerical apertures a darkfield condenser of lower NA can be used. This is illustrated by employing a ×63 objective with an NA of 0.7 and a condenser of inner cone NA of 0.71 and outer cone of NA 0.75.

As mentioned above, for many biological applications, a numerical aperture of 1.27 is presently preferred for the inner cone so that objectives of 1.25 numerical aperture can be used without requiring additional stops or irises to control their numerical aperture and the contrast of the darkfield effect. A numerical aperture of 1.33 is similarly preferred for the outer cone to match the index of refraction of aqueous media. As will be apparent to those of skill in the art, for higher index media or for highlighting high index materials that are directly in contact with the slide, then it can be preferred to employ in condenser 38 an aperture of 1.4 or greater for the outer cone. For "extreme" applications, and where the characteristics of the media surrounding the sample and the sample itself allow, it is presently preferred to employ a condenser 38 with a numerical aperture of 1.42 for the inner cone and of 1.47 or higher for the outer cone. This allows only those objects with an index of refraction greater than 1.4 and which are in intimate contact with the microscope slide, to be highlighted against a very black background since the only light which can pass into the sample when it is mounted in an aqueous media, is the light which flows into the sample at the area of contact with the slide. The sample objects thus appear to be luminous against a completely dark background. This mode allows the use of 1.4 NA objectives for the highest possible resolution. The drawbacks to this method are that any objects, either floating in the mounting media or not optically connected to the portion of the sample which is optically connected to the slide will disappear giving a false picture of the complete environment of the sample and possibly loosing some of the fine detail of the sample itself; and that objects can seemingly completely disappear without a trace if they suddenly loose contact with the slide.

One of the reasons to reduce the numerical aperture of the outer illuminating cone in aqueous applications is to limit the stray light which otherwise results when a portion of the illuminating cone from condenser 38 is reflected by total internal reflection at the glass_water interface of the sample back into condenser 38 where it becomes stray light. Alternatively, returning stray light can be trapped and absorbed in light traps or dumps created by suitably baffled or designed surface geometries.

The presently preferred types of designs for condenser 38 include the Zeiss ultradark field condenser, the older design Leitz darkfield condenser for the oil immersion use, or current production LOMO high numerical aperture darkfield condensers with an inner NA of at least 1.2.

It is presently preferred that condenser 38 employ the cone darkfield illuminator, or the coaxial darkfield/brightfield illuminator, both of which were designed after the work of the J. E. Barnard, circa 1933 and 1925 respectively and which are described in various papers and publications. In particular, in the cone condenser illustrated in FIG. 1, the illumination beam passes through a conical prism 50 which forms an angled, but still collimated, annulus of light. This annulus is reflected off the surface of a circular mirror ring 54 which focuses the light to a hollow cone of the desired geometry. The elements of condenser 38 are contained in a suitable housing 58.

The illumination beam leaving condenser 38 passes through a spherical lens 62 in such a way that the rays from the surface of mirror ring 54 pass through the surface of lens 62 at right angles and are undeviated. As condenser 38 is achromatic, it can be employed equally well for infrared, visible or ultraviolet light imaging applications.

The illumination beam from condenser 38 passes through the stage 66 of microscope 10 and the slide 70 which supports the sample/object 74 being imaged. In most circumstances, sample 74 will be covered by a cover slip 78. Due to the high numerical apertures employed, condenser 38 is preferably connected to slide 70 by a film of immersion oil as is well known to those of skill in the art.

Microscopes have historically been constructed with C-shaped frames with the objective and eye-piece at the upper end of the frame and light source and stage at the lower end of the frame. The present inventor has determined that, while convenient to use and manufacture, conventional C-shaped frames 77, shown in phantom in FIG. 1, suffer from disadvantages in that these frames are susceptible to undesired vibrations, and in fact are shaped and surprisingly act much like tuning forks. It has been found that external vibrations from any source and of virtually any frequency tend to excite the tuning fork shape of the conventional C-shaped frame to vibrate at its own resonant frequency and related harmonics, and this can distort the image resolved by the microscope. These disadvantages are particularly exacerbated with the present invention which otherwise can allow microscope 10 to resolve objects smaller than 250 nanometers, or less, and to detect objects as small as less than 50 nanometers, Accordingly, it is preferred to attenuate vibration of the microscope frame such that undesired movement of objective 40 relative to the sample 74 being imaged is inhibited.

The present inventor has determined two approaches to attenuating or eliminating this undesired vibration. The presently preferred first approach is to include or add braces 78 which connect the head of the microscope 82 to the base 86 of microscope 10. Braces 78 are attached to microscope 10 along the vertical optical axis and on either side of stage 66 of microscope 10. Braces 78 can be fabricated, machined or cast and are preferably made of a material or materials, such as aircraft aluminum alloys, or steel alloys, which have a relatively low elasticity and tendency to vibrate. In some cases it may be desired to construct the braces as composites or sandwiched layers of different materials in order to further stiffen the brace and reduce the tendency to vibrate. Preferably, braces 78 are designed to have as little resonant vibration as possible and, of the vibration which can not be eliminated, braces 78 are designed such that their resonant frequency is not a harmonic or sub_harmonic of the fundamental frequency of the vibration of the microscope C-shaped frame. In this manner the vibration of each of the frame and braces 78 tend to damp the vibrations of the other.

The method of designing the braces is to first characterize the modes of vibration of the C_frame as completely as possible, with the full range of accessories that may be used with the microscope (since the vibration can vary with the accessories used). Once the vibration modes are understood, then the braces are designed to reduce the vibration, and to attempt to make whatever vibration remains "common-_mode so that all components of the microscope vibrate in phase so there is little or no "net" vibration from the point of the imaging means relative to the object in typical use.

Another approach to eliminating the vibration in a light microscope is to employ a tubular design for the frame of microscope 10, wherein the tube surrounds stage 66 of microscope 10 in much the same way as the design of conventional scanning and transmission electron microscope sample chambers and columns. Such a tubular design can virtually eliminate the Z axis vibrations of objective 40 relative to the sample 74. While the tubular design severely limits access to the sample area, the gain in vibration performance is considerable and can be well worth the inconvenience in cases where the best possible resolution is desired.

Objective 40 of microscope 10 can be designed as a fixed focal length objective to produce a completely corrected image at the first image plane of objective 40. Furthermore, objective 40 preferably is designed such that any stray light from sample 74 which is not to form an in_focus part of the final image is attenuated by stops, irises or geometrical light trapping means. As used herein the terms "geometrical light trapping" and "geometric surfaced" are intended to comprise any surface with low reflectance in the wavelength ranges of interest and which have surfaces geometrically arranged to direct whatever small amount of light impinges on them toward other geometrical light trapping surfaces or "safe" areas where the light will not degrade operation or contrast formation of the optical instrument. Thus, substantially most or all of the light being trapped or attenuated is absorbed during reflections from successive surfaces of the geometrical surface. In some cases only one, or a few bounces, is required to sufficiently attenuate the light while in other cases a large number of bounces is required to achieve the desired level of attenuation. These geometrical surfaces are similar in theory to the absorbing surfaces of an acoustic anechoic chamber or the anti_radar surfaces of a stealth aircraft.

The use of an aperture 90 or an adjustable iris (not shown) in the same location, is desirable to exactly match the illumination beam to the numerical aperture of objective 40 to ensure that the best possible darkfield image is obtained.

It is presently preferred to employ an adjustable, rather than fixed, iris in microscope objective 40 as the opening of such an adjustable iris to its full NA in a high power objective with an NA greater than 1.25, when used with a darkfield condenser of NA 1.25 inner cone, is to allow objective 40 to operate at an aperture greater than the inner illuminating cone of condenser 38. In this configuration, microscope 10 can be employed in an unusual brightfield mode which accentuates surface topography of sample 74 while substantially maintaining a high contrast and resolution of the obtained image. When inverted, this image appears to resemble a conventional SEM image of a surface. Further, a slight enhancement of the resolving power of objective 40 can be obtained due to the increase in numerical aperture. This brightfield mode can provide a novel image appearance to provide image information that was previously unobtainable.

If objective 40 is an infinity corrected objective, then a suitable matching tube lens (not shown) is employed to convert the infinity light to fixed focal length light. It is advantageous to employ a tube lens with the shortest possible focal length in order to keep the length of a coupling tube between the tube lens and the imaging means to a minimum. This short coupler length helps to reduce weight and vibration of the imaging means relative to the object and, or the tube lens.

Normally the objective 40, or the tube lens in an infinity corrected system, produces a primary image with a circular diameter of approximately 20 to 25 mm. Since the IDC microscope uses an imaging means generally in the first image plane of the objective or tube lens, it is often the case that the imaging means has an active area of only 8 to 12 mm on a side, in a square or rectangular format. In this case, the light path carrying the image must be apertured or attenuated with geometrical light stop surfaces to eliminate the light outside the active image area, so that the light falling outside the active image area does not become stray light in the system.

If a fluorescence capability is to be provided for microscope 10 and an infinity corrected objective 40 and matching tube lens is employed in microscope 10, an emission filter (not shown) or filters (such as conventional filter cube set with emission, excitation and beamsplitter elements such as are commonly used in reflected light microscopes and which can also be employed herein with a standard system of light source and optics for reflected fluorescent light microscopy) can be located between objective 40 and the tube lens in the infinity space. If a fixed focal length objective 40 is employed, then the emission filter or filters for fluorescence microscopy can be included in head 82 of microscope 10.

Where this emission filter (or filters) is used with fixed focal length objectives, it is preferred to coat the emission filter onto the thinnest possible filter substrate so that the deviations of the image due to the index of refraction of the filter coatings and substrate will be as small as possible. The filter or filters can be on a slide or can be on a turret or filter wheel arrangement, as will be apparent to those of skill in the art. Where these filters are used to create artificial color, when a monochrome digital camera is employed or where they are used for multiple fluorescence techniques or when numerically processed pseudo_color computer driven imaging is employed, then the filter turret or wheel can be digitally controlled and electrically driven.

A fixed focal length objective can be expected to produce a brighter (more photon efficient) and a more highly corrected image in the first image plane than an infinity corrected system, due to the lower number of surfaces and components relative to an infinity focused objective. Where fixed focal length objectives are employed, it can be desirable to design the objectives with a much shorter back focal length in order to substantially reduce the overall height of the microscope as described above for infinity corrected tube lens to imaging means coupling.

Microscope 10 can include a single objective 40, or can include two or more objectives 40 which can be selected for use as desired. In this latter case, the objectives 40 can be mounted on any appropriate mounting means, such as the conventional revolving nosepiece used in many microscope designs.

The light leaving objective 40 passes through a first aperture 94 and then, when leaving head 82 of microscope 10, through a carefully controlled second aperture 96 which blocks any light rays not in the desired image forming beam. The walls of head 82 and a coupler 98 are of relatively large internal diameter to further reduce stray light and improve image contrast. The inner surfaces of head 82 and coupler 98 can also be machined with geometrical surfaces to control and substantially eliminate light reflections from reaching the imaging means, discussed below.

The inner surfaces of the objective 40, head 82 and coupler 98 are preferably finished in a flat black or other suitable finish to obtain the lowest possible coefficient of reflection for light of the wavelengths being employed to form the final image. Generally this will be flat black or anodized black finishes.

Before the light containing the image information reaches the imaging means, it passes through another aperture or stop 102 which is shaped to further limit stray light. This aperture can be a square or other shaped aperture to match the geometry of the imaging means.

For the present invention, to use most current production objectives, it is desirable to add stray light control means to the objectives. These stray light control means include finishing the edges of the lens to a fine line surface (for plano_convex and double convex lens elements), blacking the outer peripheral surfaces of the lenses and/or finishing the peripheral surfaces to geometrical configurations to control stray light bounce, adding apertures or stops, providing ultra low reflection or geometrically engineered surfaces on inner diameters of lens mounts and barrels, and carefully controlling the antireflection coatings to prevent stray light from migrating towards the imaging means.

Objectives for use in IDC microscopes in accordance with the present invention should also be rigorously checked to determine how closely they accomplish the theoretical limits for an objective of their design and for the physical limit, according to physics, for such an objective design. Components of the objective should then be adjusted to achieve the highest possible conformance with theoretical performance possibilities. The use of a suitable test slide, such as that sold under the name "Richardson Test Slide" by Bio_Microtech Inc., P.O. Box 23, Bolton, Ontario, L7E 5T1, and described in Richardson, T. (1998), Test Slides: Diatoms to Divisions_What are you looking at? Part 1, is very useful in confirming the performance of each aspect of the IDC system, including the illuminating, objective and imaging components and all the connecting components in or adjacent to the light path.

Traditional eyepieces, whether part of a monocular, binocular or trinocular design, have been eliminated in this design to improve the photon efficiency of the system and to remove the need to correct the optics in the ocular system to the same high standards as the rest of the optical system. Removing the ocular system also reduces costs materially, provides a lighter, more compact design, and offers the operator a more user_friendly interface with less fatigue and virtually infinite ergonomic flexibility, as the final image is viewed on a video or digital monitor which can positioned virtually anywhere to suit the ergonomics of the situation.

In the embodiment shown in FIG. 1, the imaging means 106 is a three detector CCD camera such as a model GP_US532 manufactured by Panasonic, with an internal prism 110 and three charge coupled array detectors 114, 118 and 122 is placed at the primary image plane of the objective (or the objective tube lens combination in the case of infinity corrected optical systems). Placing imaging means 106 in the first focal plane of the objective is presently believed to be advantageous since it improves the image brightness as otherwise, the presence of any intervening optics would introduce light losses, and since it maintains the highest possible image resolution and contrast which would otherwise be degraded by any other intervening optics.

A low light broadcast grade video camera, such a model WV__13590 manufactured by Panasonic, can also be used as the imaging means. This type of camera is particularly suited for low light work where photon damage to the sample must be kept to a minimum. It is also suitable for fluorescent work where the image has low light levels and where excitation energy must be kept to a minimum to reduce photon damage and bleaching of the sample and fluorophores.

The electronic image acquired by imaging means 106 is provided to a control unit 128 which can contain automatic gain controls, white balance, black balance and auto iris functions, all of which can be controlled or limited by the operator of the system for maximum imaging control and flexibility.

A particular advantage of this system is the use of a video camera with the ability to display fields of image versus frames. When only the odd or even fields are displayed and the interlace information is interpolated from the adjacent fields then effective frame speeds equal to the field rate can be achieved. This is important when it is desired to study very high speed motion with a minimum of motion during the image acquisition time. It is also useful to use electronic shuttering to limit the motion during a field duration.

The electronic signal from imaging means 106 and control unit 128 is then provided to image inverter system 132 which electronically converts it to obtain either the luminance, chrominance, or luminance and chrominance, negative image of the image provided to it from control unit 128. A trivial example of the function of image inverter system 132 would be that an image of a black spot on a white background is converted to a white spot on a black background when both luminance and chrominance are inverted. Both control unit 128 and the image inverter system 132 can be included as internal or integral components of the imaging means 106.

Alternatively, internal or switchable programming of control unit 128 can be used to accomplish the image inversion. This is especially useful when it is desired to have the microscope operate at all times in the inverted mode where one or both of the luminance or chrominance information is inverted.

Depending on how the chrominance information is to be handled by the image inverter system 132, then the resulting color in the final image leaving image inverter system 132 can either be a color correct image or a color negative image of the image provided to system 128. Further, depending on what type of images are coming from sample 74, it can be desirable to view the image without the inverting conversion being performed. Accordingly, image inverter system 132 can forward both the inverted image and the non_inverted image. In this way, image inverter system 132 provides as many as four modes of output images. The first mode being the normal positive image, the second mode being the negative image with color in the negative (when luminance and chrominance are inverted), the third mode being where color is not in the negative, but the brightness is the negative (when only luminance is inverted, which can be especially useful when the system is used to view samples with stains, such as vital stains, or known color) and the fourth mode being where color is negative but brightness is not negative (which can be useful for studying color differences which are accentuated when inverted due to the characteristics of the human eye or the camera or the video monitor).

In the embodiment of FIG. 1, image inverter system 132 does nothing to alter the resolution or the contrast of the image. The resolution and the contrast information is solely derived from the optical methods employed being darkfield illumination, optimal correction of the optics to provide superior image quality and photon efficiency, vibration control and attenuation, and careful attention to photon budgets to account for substantially all the photons leaving light source 14 to ensure that they contribute to the final in_focus image. Control of stray light in microscope 10 is an important factor in obtaining the final high contrast image.

The human visual system is far better adapted to, and used to, processing information, when image information is presented as black or color on a substantially white background, much as text is normally displayed on paper. The darkfield image is not visually familiar to the normal viewer and therefore. the brain has difficulty extracting the most information from the image. A good example is the difficulty we have trying to interpret or understand image information when viewing a photographic negative, either of a color or black and white scene. When we look at a positive image of the same negative we can easily interpret the information "correctly", even though both the positive and negative images contain the same information and one is only the luminance and chrominance inverse of the other. It has been found that the image produced from the IDC system generally need not be enhanced by digital image processing techniques as it appears to be located in the region of information which is best interpreted by the human mind. The only adjustments that have been found to often be helpful are adjustments of the black and white offset levels on the analog or digital control system to delivery more information on faint features.

In normal use, the illumination control which provides linear adjustment of the light level from zero to the maximum that light source 14 is capable of, is used in conjunction with the electronic gain controls of imaging means 106 to deliver the best image for the information desired. To study fine details in a sample, high levels of illumination are used and low electronic gain is employed, so that electronic noise is minimized and fine resolution is maximized. For long term studies at lower resolution, the light level is kept at the lowest possible level and the electronic gain is switched to the highest possible setting so that a useable image is delivered at a low light level, from the point of view of the sample. For high sensitivity detection of small particles, background organisms or structures, both the light level and the gain are set to their maximum which produces strong contrast in fine structures and high optical amplification to that small structures take on a high contrast and electronically noisy, and thus easily distinguished, appearance.

Alternately image inverter system 132 can be implemented in a computer_based image processing system (not shown) wherein the imaging means is an analog camera and the computer contains an image capture card for converting the analog image to a digital image or where the imaging means is a digital camera and the computer processes the digital data directly. The advantage of using the computer-_based image processing system with this type of microscopy is that color can be mapped to the acquired image in a defined way to best suit the application. Contrast expansion and pseudo_color techniques, along with other known image processing techniques, such as edge enhancement, can be beneficial to extract further information from the images obtained.

The final acquired and processed image is displayed to the operator on a monitor 136 which can be an analog monitor or a computer monitor. It can be desirable to provide switches such as 140 and 144 to select the video mode being viewed. In the embodiment of FIG. 1, switch 140 selects the positive video image provided via connection 148 and switch 144 selects the negative video image provided via connection 152.

The final image can be recorded using analog means such as on video tape or digitally as digital video or digital image files of either still (such as TIFF, or JPEG type files) or motion video (such as MPEG, MPEG2 or AVI type files). Current IDC systems are using S_VHS format recorders, or RGB professional video recorders. It is contemplated that DVD or a Raid Array or similar digital recording strategies will be offered as the recording means as they become commercially available and more cost effective. "Casino" type time lapse video recorders are also currently used with the IDC to allow studies of samples over long time interval of hours to days.

Figure 2:
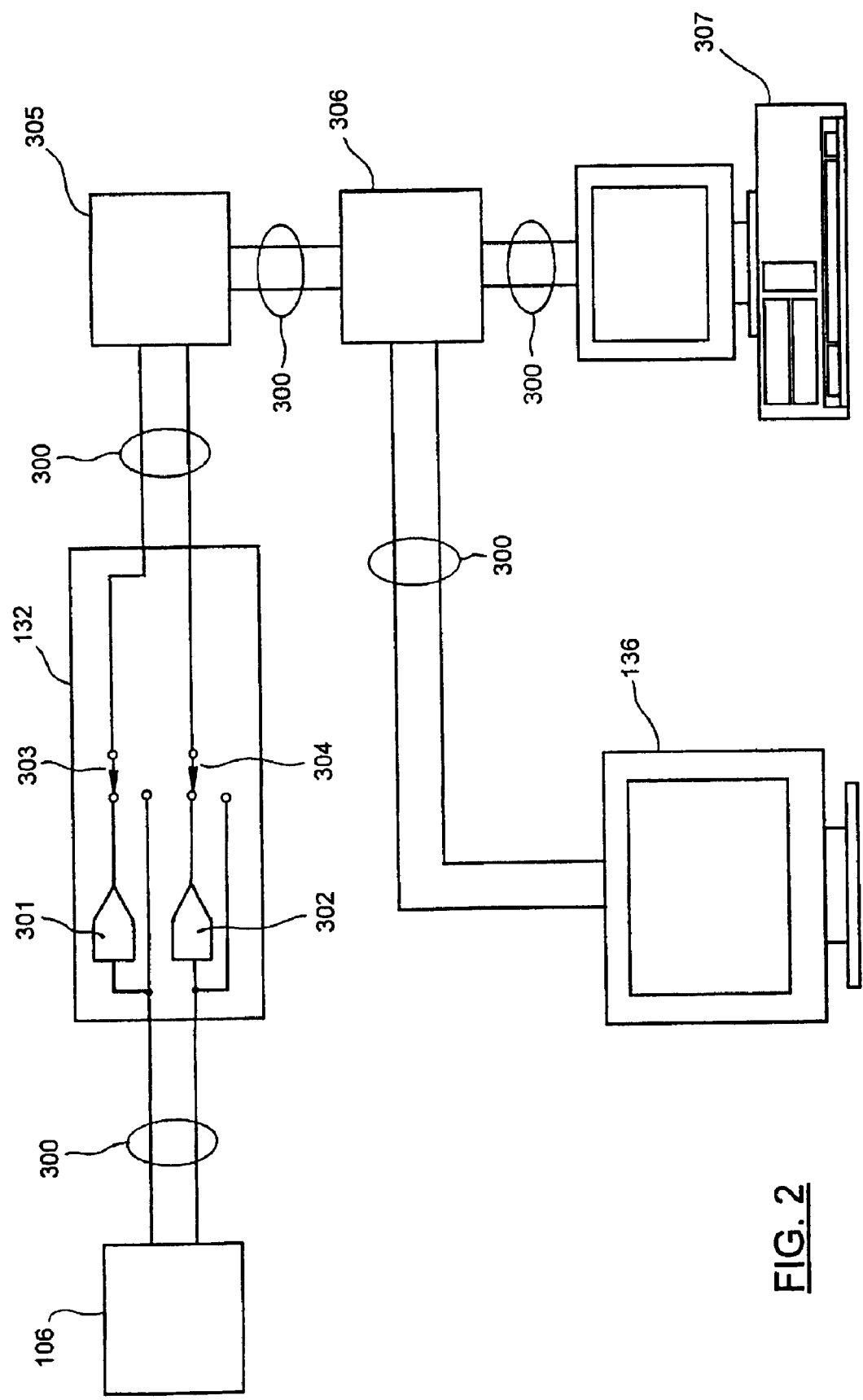
FIG. 2 shows an embodiment of the arrangement of the video system of the IDC microscope.

Currently, as shown in FIG. 2, digital capture from the imaging means 106 whose S_Video signal 300 is supplied to image inverter system 132 which contains luminance inverter 301 and chrominance inverter 302 and luminance invert/non_invert switch 303 and chrominance invert/non-invert switch 304. The signal from the image inverter system 132 is supplied to an S-Video recorder 305 and the signal loops through to a time lapse recorder 306, monitor 136 and image capture system incorporated into computer 307. The image capture systems supplied currently with IDC systems include IOMEGA Buzz image capture systems or MATROX Genesis image capture system in conjunction with a suitable PC computer system. The Buzz offers a low cost method for general purpose capture of images. The Genesis is a professional grade image capture system which allows more detail to be collected.

This method of microscopy can be used with high power high numerical aperture objectives or with lower power objectives. The main limiting factor is the numerical aperture of the objective so that the objective aperture is smaller than the inner illuminating cone of the illumination system. This makes microscopes in accordance with the present invention ideal for examining cells, such as human biopsy or plant cells, at low magnifications initially and then switching to higher magnifications later on for more detailed analysis.

As will be apparent to those of skill in the art, it is possible to employ electrochemical, electroluminescent, fluorescent, liquid crystal or image intensifier based schemes to provide the positive to negative conversion in this method. If such means are used, then conventional binoculars or trinoculars can be used to view the image of the object but some of the contrast and resolution will be lost.

It is further contemplated that ultrafine focusing of the microscope can be accomplished by controlled distortion of the vibration control braces 78 of microscope 10. For example, if a hydraulic cylinder 75, illustrated schematically in FIG. 1, is used to couple the braces 78 together, then adding fluid to the hydraulic cylinder will force the braces 78 apart and deflect objective 40 towards sample 74 very slightly, thus providing a very fine focus control. If a very fine screw (not shown) is used to drive a very small bore piston (not shown) into a cylinder (not shown) filled with hydraulic oil and the resulting pressurized oil is supplied to the hydraulic cylinder connecting braces 78, then a very ultrafine focus can be implemented. Such an adjustment screw can be under computer or external electrical control. The same type of function can be accomplished with a screw mechanism either in tension or compression between the braces 78 so that adjustment of the screw mechanism accomplishes the fine focus.

It is also contemplated that microscope 10 can employ one or more piezoelectric struts located similarly to cylinder 75 between braces 78 to accomplish the ultrafine focusing of the microscope. Variation of the voltage on the piezoelectric struts will shift the focus of the microscope slightly. Alternatively, each brace can be fabricated in two units and can include a piezoelectric layer sandwiched between the upper and lower halves of the braces, located as illustrated in FIG. 3, so that the piezo element can vary its thickness and by so doing alter the length of the braces.

Figure 3:
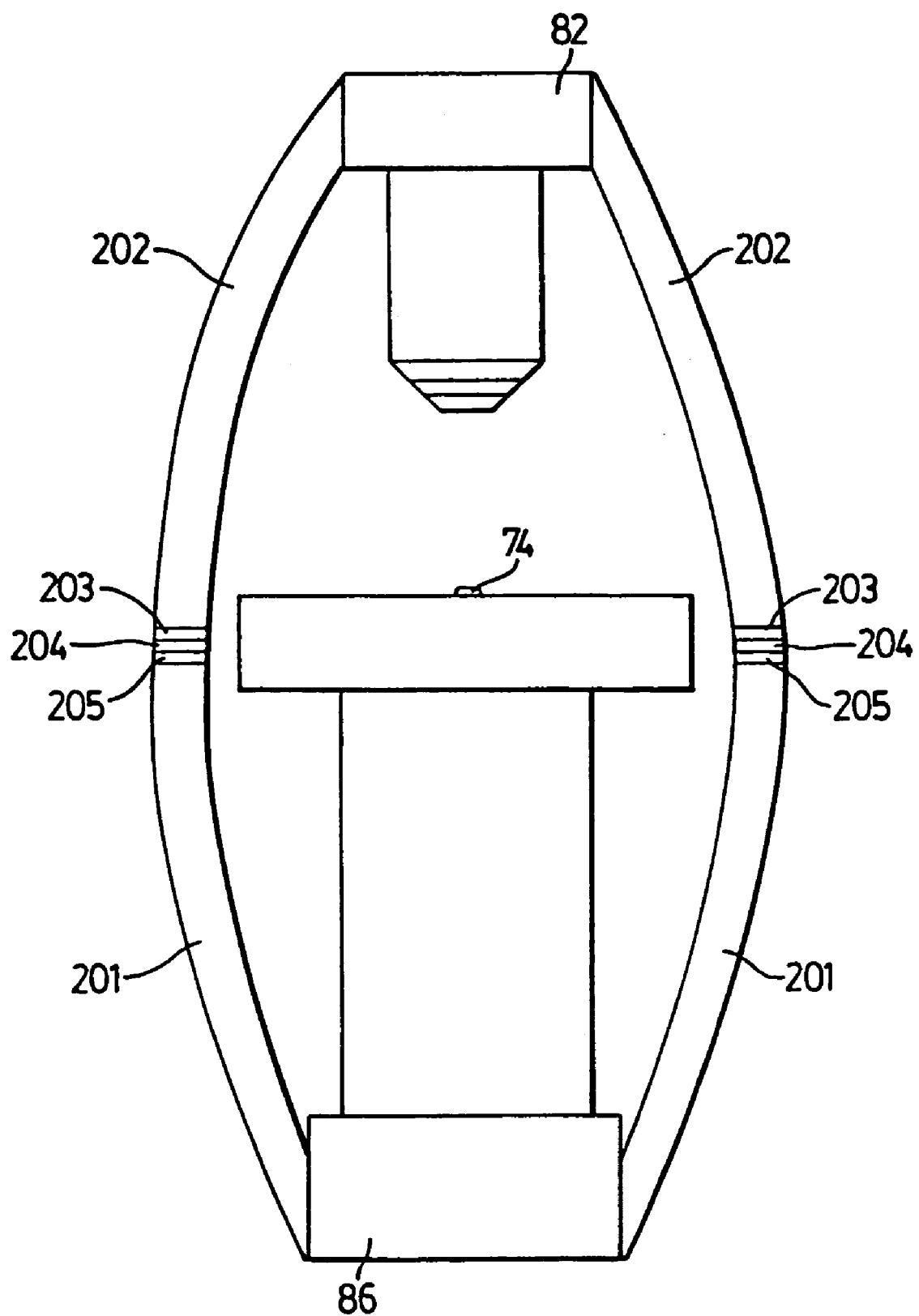
FIG. 3 shows an embodiment of a piezoelectrically actuated brace.

FIG. 3 shows such a configuration of two braces containing piezoelectric elements for active Z position control. The top portion of the body of the microscope 82 is connected to the top halves of each brace 202. The lower surface of brace 202 is adhered to an insulating and conductive top electrode 203, which allows the connection of the piezo to a voltage source. Electrode 203 is connected to piezo electric layer 204 which is adhered to the bottom electrode 205. Electrode 205 is adhered to the bottom half of the brace 201. A voltage applied between electrodes 203 and 205 causes a change in dimension of piezo layer 204 and moves the imaging means and related optics relative to the sample object 74,A further application of this piezoelectric system is to move the microscope Z adjustment in synchrony with a vibrating sample 74 to obtain images of samples undergoing or exhibiting fixed frequency vibrations which have apparently halted the motion of the sample, at least in the Z plane. Alternately a three axis piezo mount can be used to secure the objective to the microscope body. By driving this mount in synchronized three dimensional patterns it can be possible to freeze the motion of a sample object in rapid oscillation by matching the motion of the objective to the motion of the object.

It is possible that reflections from the surface of the CCD camera or other imaging means can bounce back and forth in the space between the CCD camera and the back lens of objective 40 or the tube lens. It is contemplated that a benefit can be obtained by inserting a photonic valve, such as a one way mirror (not shown), to eliminate light returning to the objective lens from the imaging means and thereby eliminate a possible source of stray light and to improve the contrast.

The overall size of microscope 10 can be substantially reduced by incorporating the light source 14 into the internal housing of the condenser 38. Such a design was proposed by Zeiss in the 1930 for darkfield condensers. If a brightfield and darkfield combination condenser such as the Barnard coaxial, described above, is employed then the size can be kept very small while maintaining both brightfield and IDC modes of operation.

In order to provide a low power and extremely robust and compact IDC microscope for field use in rough environments, one or more light emitting diodes (not shown) can be employed as the light source and a conical prism_type condenser can be employed to take best advantage of this type of illumination.

Where color correction is an important factor, an array of light emitting diodes of different wavelengths can be used with an LED control means to vary the relative brightness from each of the LED's. In this way a color matched lighting system can be obtained. Depending on how the LED's are arranged, the color and the position and style of illumination can be varied to meet the needs of the application.

Figure 4:
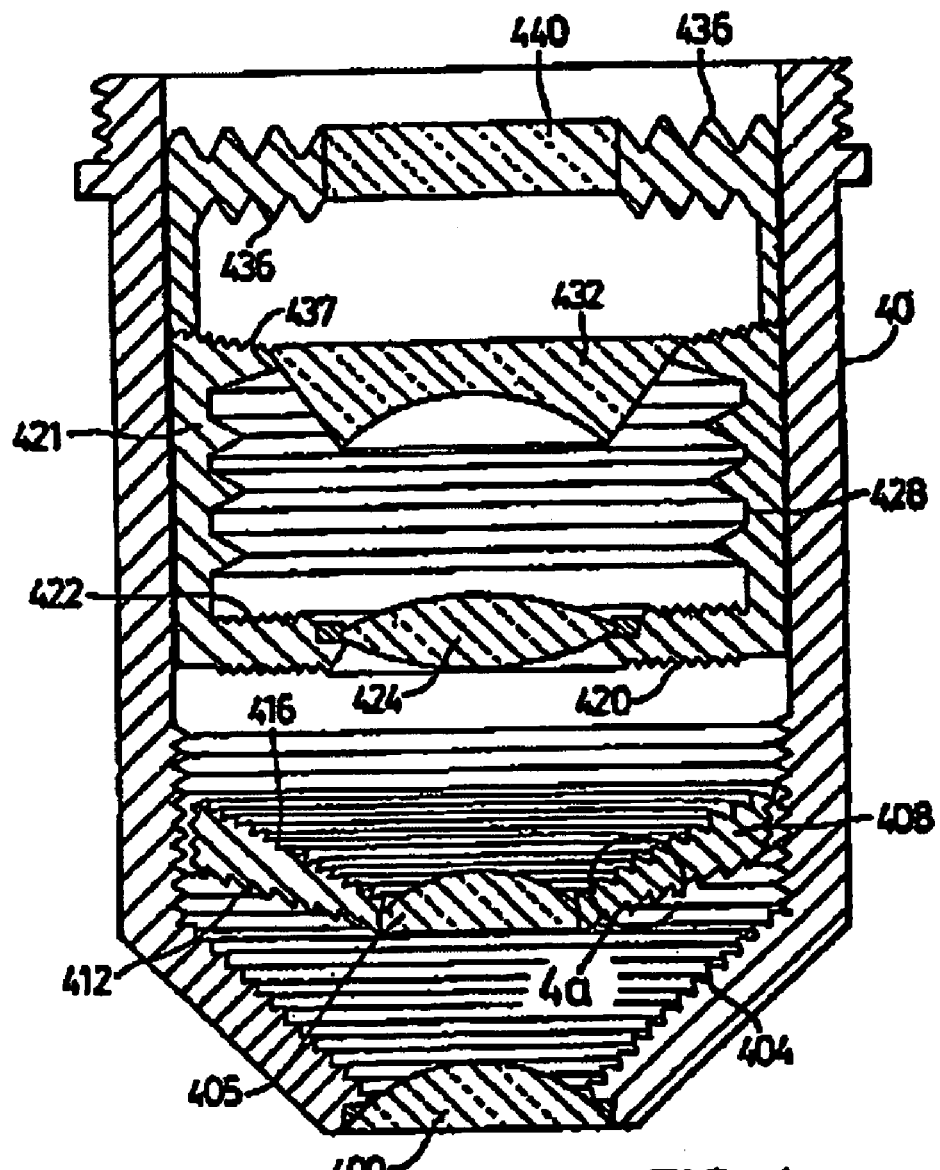
FIG. 4 shows a cross section of atypical objective used in an IDC microscope in accordance with the present invention.
Figure 4A:
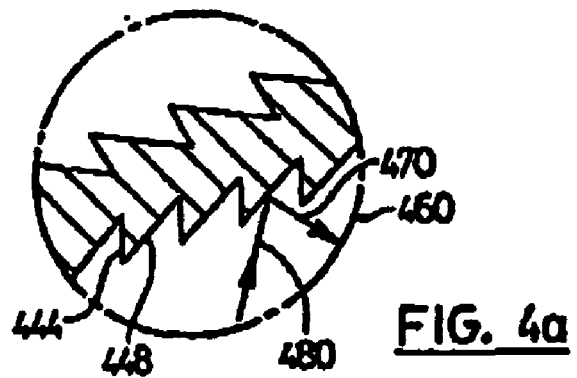
FIG. 4a shows the detail of the area identified at A in FIG. 4.

FIG. 4 shows a cutaway of the internal construction of an objective for an IDC microscope. Light enters the objective 40 through the first lens 400, here shown as an oil immersion lens, stray light or high numerical aperture light which is not to form part of the in focus image as determined using photon budgeting techniques, is incident on the lower surface of mount 408 for lens 405. In focus light passes through lens 405. The geometrical light trapping features of mount 408 are located on the top 416 and bottom 412 surface of the mount 408. Detail 460 shows that the features 412 and 416 are not symmetrical but instead have surfaces 444 and 448 on the lower surface which are designed to reflect incoming light 480 away from the optical axis as reflected light 470 and into geometrical surface 404 on the inside of the objective mount or casing. Where the outer edge of a lens 405 is flat then the outer edge can be painted flat black to reduce reflections and stray light. Where the edge of the lens allows as in double convex lens 424 and plano_concave lens 432 the outer edge is polished to a fine point or surface so that internal reflections or diffusion are minimized. Stray light in the upper section of the objective is controlled by geometrical light trapping surfaces 416 on the lens mounts 408. The upper lenses are mounted in component 421 with lenses 424 and 432 and geometrical light trapping surfaces 420, 422, and 428. Stray light is prevented from leaving the objective by aperture stop 440 and its inner geometrical light control surface 436 working in conjunction with surface 437. Reflections from the tube lens or the imaging means are further controlled by geometrical light trapping surface 436.

The above-described embodiments of the invention are intended to be examples of the present invention and alterations and modifications may be effected thereto, by those of skill in the art, without departing from the scope of the invention which is defined solely by the claims appended hereto.

The invention claimed is:

1. A microscope comprising:
   a head portion including an objective;
   a base portion having a stage mounted thereto;
   a C-shaped frame connecting the head portion and base portion; and
   two curvilinear braces connecting the head portion to the base portion.

2. A microscope according to claim 1, wherein each brace is disposed generally parallel to a vertical optical axis of the microscope.

3. A microscope according to claim 2, wherein each brace has a resonant frequency that is not a harmonic or sub-harmonic of the fundamental frequency of vibration of the C-shaped frame.

4. A microscope according to claim 3, including means for coupling the two braces together and forcing the braces closer together or further apart, thereby adjusting the distance between the objective and the stage.

5. A microscope according to claim 4, wherein a hydraulic cylinder is used to couple the braces together and selectively force the braces closer or further apart.

6. A microscope according to claim 4, wherein a piezoelectric strut is used to couple the braces together and selectively force the braces closer or further apart.

7. A microscope according to claim 3, including means for altering the length of said braces, thereby adjusting the distance between the objective and the stage.

8. A microscope according to claim 7, wherein each brace includes a piezoelectric layer therein for altering the length of the brace.

9. A microscope according to claim 1, wherein each brace comprises a composite of different materials or sandwiched layers of different materials.

10. A microscope according to claim 1, wherein each brace has a resonant frequency that is not a harmonic or sub-harmonic of the fundamental frequency of vibration of the C-shaped frame.

11. A microscope according to claim 1, including means for coupling the two braces together and forcing the braces closer together or further apart, thereby adjusting the distance between the objective and the stage.

12. A microscope according to claim 11, wherein a hydraulic cylinder is used to couple the braces together and selectively force the braces closer or further apart.

13. A microscope according to claim 11, wherein a piezoelectric strut is used to couple the braces together and selectively force the braces closer or further apart.

14. A method of operating a microscope defined according to claim 11, the method comprising:
   selectively adjusting the distance between the objective and the stage by adjusting said means for coupling the two braces together and to force the braces closer together or further apart.

15. A microscope according to claim 11, wherein each brace is disposed generally parallel to a vertical optical axis of the microscope.

16. A microscope according to claim 1, including means for altering the length of said braces, thereby adjusting the distance between the objective and the stage.

17. A microscope according to claim 16, wherein each brace includes a piezoelectric layer therein for altering the length of the brace.

18. A method of operating a microscope defined according to claim 16, including adjusting the length of each brace along a vertical optical axis of the microscope by expanding or contracting the overall length of the brace.

19. A method according to claim 18, wherein each brace includes a piezoelectric layer, the thickness of which can be varied by the application of an applied voltage.

* * * * *